(12) United States Patent
Seshadri et al.

(10) Patent No.: US 10,681,402 B2
(45) Date of Patent: Jun. 9, 2020

(54) PROVIDING RELEVANT AND AUTHENTIC CHANNEL CONTENT TO USERS BASED ON USER PERSONA AND INTEREST

(71) Applicant: INTERNATIONAL BUSINESS MACHINES CORPORATION, Armonk, NY (US)

(72) Inventors: Padmanabha Venkatagiri Seshadri, Mysore (IN); Vijay Kumar Ananthapur Bache, Bangalore (IN); Vijay Ekambaram, Chennai (IN); Saravanan Sadacharam, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/155,189

(22) Filed: Oct. 9, 2018

(65) Prior Publication Data

US 2020/0112755 A1    Apr. 9, 2020

(51) Int. Cl.
*H04H 60/33* (2008.01)
*H04N 21/25* (2011.01)
(Continued)

(52) U.S. Cl.
CPC ......... *H04N 21/251* (2013.01); *G06N 3/0427* (2013.01); *G06N 3/088* (2013.01); *H04N 21/2407* (2013.01); *H04N 21/25891* (2013.01)

(58) Field of Classification Search
CPC .............. H04N 21/251; H04N 21/2407; H04N 21/25891; G06N 3/0427; G06N 3/088
See application file for complete search history.

(56) References Cited

U.S. PATENT DOCUMENTS 6,917,965 B2    7/2005  Gupta et al.
7,085,925 B2    8/2006  Hanna et al.
(Continued)

OTHER PUBLICATIONS

Zhang et al., "Hierarchical classification of audio data for archiving and retrieving", In Acoustics, Speech, and Signal Processing, 1999. Proceedings., 1999 IEEE International Conference on, vol. 6, pp. 3001-3004. IEEE, 1999, 4 pages.
(Continued)

*Primary Examiner* — Mulugeta Mengesha
(74) *Attorney, Agent, or Firm* — Brian M Restauro; Andrew D. Wright; Roberts Calderon Safran & Cole, P.C.

(57) ABSTRACT

A computer-implemented method comprising: receiving, by a computing device, content for a channel for publishing; determining, by the computing device, a measure of trustworthiness of the content; publishing, by the computing device, the content for the channel based on the measure of trustworthiness satisfying a threshold; generating, by the computing device, a channel persona profile for the channel based on the content associated with the channel and based on publishing the content; generating, by a computing device, a user persona profile for a user; determining, by the computing device, a match score indicating a level to which the channel persona profile matches the user persona profile; determining, by the computing device, channel discovery recommendation information based on the match score; and outputting, by the computing device, the channel discovery recommendation information.

20 Claims, 13 Drawing Sheets

(51) Int. Cl.
*G06N 3/04* (2006.01)
*H04N 21/24* (2011.01)
*H04N 21/258* (2011.01)
*G06N 3/08* (2006.01)

(56) References Cited

U.S. PATENT DOCUMENTS

| | | |
|---|---|---|
| 7,111,009 B1 | 9/2006 | Gupta et al. |
| 7,647,555 B1 | 1/2010 | Wilcox et al. |
| 7,680,770 B1 | 3/2010 | Buyukkokten et al. |
| 7,702,728 B2 | 4/2010 | Zaner et al. |
| 7,716,112 B1 | 5/2010 | Highland et al. |
| 8,074,251 B2 | 12/2011 | Aoki et al. |
| 8,621,019 B2 | 12/2013 | Nguyen et al. |
| 8,650,649 B1 | 2/2014 | Chen et al. |
| 8,676,937 B2 | 3/2014 | Rapaport et al. |
| 8,788,495 B2 | 7/2014 | Shu |
| 8,938,512 B1 | 1/2015 | Jackson et al. |
| 8,984,422 B2 | 3/2015 | Eidelson et al. |
| 9,208,157 B1 | 12/2015 | Kacholia et al. |
| 2011/0320373 A1 | 12/2011 | Lee et al. |
| 2014/0122456 A1* | 5/2014 | Dies ............... G06F 16/951 707/706 |
| 2015/0082330 A1* | 3/2015 | Yun ............... H04N 21/233 725/14 |
| 2017/0019496 A1 | 1/2017 | Orbach |
| 2017/0091849 A1 | 3/2017 | Greystoke et al. |
| 2017/0142188 A1 | 5/2017 | Chang et al. |
| 2019/0082224 A1* | 3/2019 | Bradley ............ H04N 21/4756 |

OTHER PUBLICATIONS

Dong et al. "Knowledge Vault: A Web-Scale Approach to Probabilistic Knowledge Fusion", In Proceedings of the 20th ACM SIGKDD international conference on Knowledge discovery and data mining, pp. 601-610, ACM, 2014, 10 pages.

Dong et al.,"Knowledge-based trust: Estimating the trustworthiness of web sources", Proceedings of the VLDB Endowment 8, No. 9, pp. 938-949, 2015, 12 pages.

Bosu et al., "Building Reputation in StackOverflow: An Empirical Investigation", In Proceedings of the 10th Working Conference on Mining Software Repositories, pp. 89-92. IEEE Press, 2013, 4 pages.

Sherchan et al, "A Survey of Trust in Social Networks", ACM Computing Surveys, vol. 45, No. 4, Article 47, Aug. 2013, 33 pages.

Mui, "Computational Models of Trust and Reputation: Agents, Evolutionary games, and Social Networks", Massachusetts Institute of Technology, Dec. 20, 2002, 139 pages.

Masthoff, "Group Recommender Systems: Combining individual models", Recommender Systems Handbook, pp. 677-702, Springer US, 2011, 26 pages.

Galley et al., "Discourse segmentation of multi-party conversation", In Proceedings of the 41st Annual Meeting on Association for Computational Linguistics—vol. 1, pp. 562-569, Association for Computational Linguistics, 2003, 8 pages.

Joty et al. "Topic Segmentation and Labeling in Asynchronous Conversations", Journal of Artificial Intelligence Research 47 (2013), pp. 521-573, Jul. 2013, 53 pages.

Hsueh et al., "Automatic Segmentation of Multiparty Dialogue", EACL, 2006, 8 pages.

Harrysson, "Neural probabilistic topic modeling of short and messy text", Degree Project in Computer Science and Engineering, Second Cycle, 30 Credits, Stockholm, Sweden, 2016, 41 pages.

Anonymous, "IBM Watson: Sentiment and Context Analysis", https://www.pubnub.com/docs/blocks-catalog/group-sentiment-analysis, Apr. 4, 2017, 2 pages.

Lerch, "Music Information Retrieval & Machine Listening", https://www.audiocontentanalysis.org/, accessed Oct. 5, 2018, 2 pages.

Lu et al., "Towards a Unified Framework for Content-Based Audio Analysis", http://ieeexplore.ieee.org/stamp/stamp.jsp?tp=&arnumber=1415593, 2005 IEEE, 4 pages.

Wang et al., "Hybrid video emotional tagging using users' EEG and video content", https://www.ecse.rpi.edu/~cvrl/Publication/pdf/Wang2014i.pdf, Springer Science+Business Media New York 2013, Apr. 10, 2013, 27 pages.

Loviscach, "In the Mood: Tagging Music with Affects", https://link.springer.com/chapter/10.1007/978-3-540-85099-1_19, Affect and Emotion in HCI, LNCS 4868, pp. 220-228, Springer-Verlag Berlin Heidelberg 2008, 4 pages.

Mell et al., "The NIST Definition of Cloud Computing", NIST, Special Publication 800-145, Sep. 2011, 7 pages.

* cited by examiner

PROVIDING RELEVANT AND AUTHENTIC CHANNEL CONTENT TO USERS BASED ON USER PERSONA AND INTEREST

BACKGROUND

The present invention generally relates to providing relevant and authentic channel content to users and, more particularly, to providing relevant and authentic channel content to users based on user persona and interest.

An internet-based media channel (or channel) may include a netcast or group of internet-accessible audio/video content. Channel content may include an episodic series of digital audio or video files which a user can download and listen to. Channel content may be available on a subscription basis, so that new episodes are automatically downloaded via web syndication to the user's own local computer, mobile application, or portable media player. Subscriptions to channels may revolve around topics personalized to listener preferences, and may be streamed or downloaded on demand. Channel content may be associated with social media platforms, and may be either transient or non-transient. Thousands or more audio artifacts related to internet-based media channels may be available for users to cater to users' varying interests. Social media-based channels may be formed by users of similar interest across geographies to interact and enjoy a shared experience surrounding content of a particular topic with which the users share an interest.

SUMMARY

In an aspect of the invention, a computer-implemented method includes: receiving, by a computing device, content for a channel for publishing; determining, by the computing device, a measure of trustworthiness of the content; publishing, by the computing device, the content for the channel based on the measure of trustworthiness satisfying a threshold; generating, by the computing device, a channel persona profile for the channel based on the content associated with the channel and based on publishing the content; generating, by a computing device, a user persona profile for a user; determining, by the computing device, a match score indicating a level to which the channel persona profile matches the user persona profile; determining, by the computing device, channel discovery recommendation information based on the match score; and outputting, by the computing device, the channel discovery recommendation information In an aspect of the invention: there is a computer program product for determining the authenticity of channel content and determining the relevancy of new channels to users. The computer program product includes a computer readable storage medium having program instructions embodied therewith, the program instructions executable by a computing device to cause the computing device to: receive content for a channel for publishing; determine a measure of trustworthiness of the content; publish the content for the channel based on the measure of trustworthiness satisfying a threshold; determining channel discovery recommendations for a user based on matching a plurality of channel persona profiles with a user persona profile associated with the user; output the channel discovery recommendation information; and generate a memento personalized to the user, wherein the memento identifies points of interest during a session when the user access the content.

In an aspect of the invention, there is a system comprising: a processor, a computer readable memory and a computer readable storage medium associated with a computing device; program instructions to receive content for a channel for publishing; program instructions to extract audio characteristics of the content and video characteristics of content, wherein the audio characteristics of the content comprise a transcription of the audio of the content, and the video characteristics of the content comprise image analysis of video of the content; program instructions to search one or more knowledge bases based on the audio characteristics and the video characteristics; program instructions to generate a trustworthiness score based on the audio characteristics, and the video characteristics, and the searching the one or more knowledge bases; and program instructions to publish the content for the channel based on the trustworthiness score satisfying a threshold. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
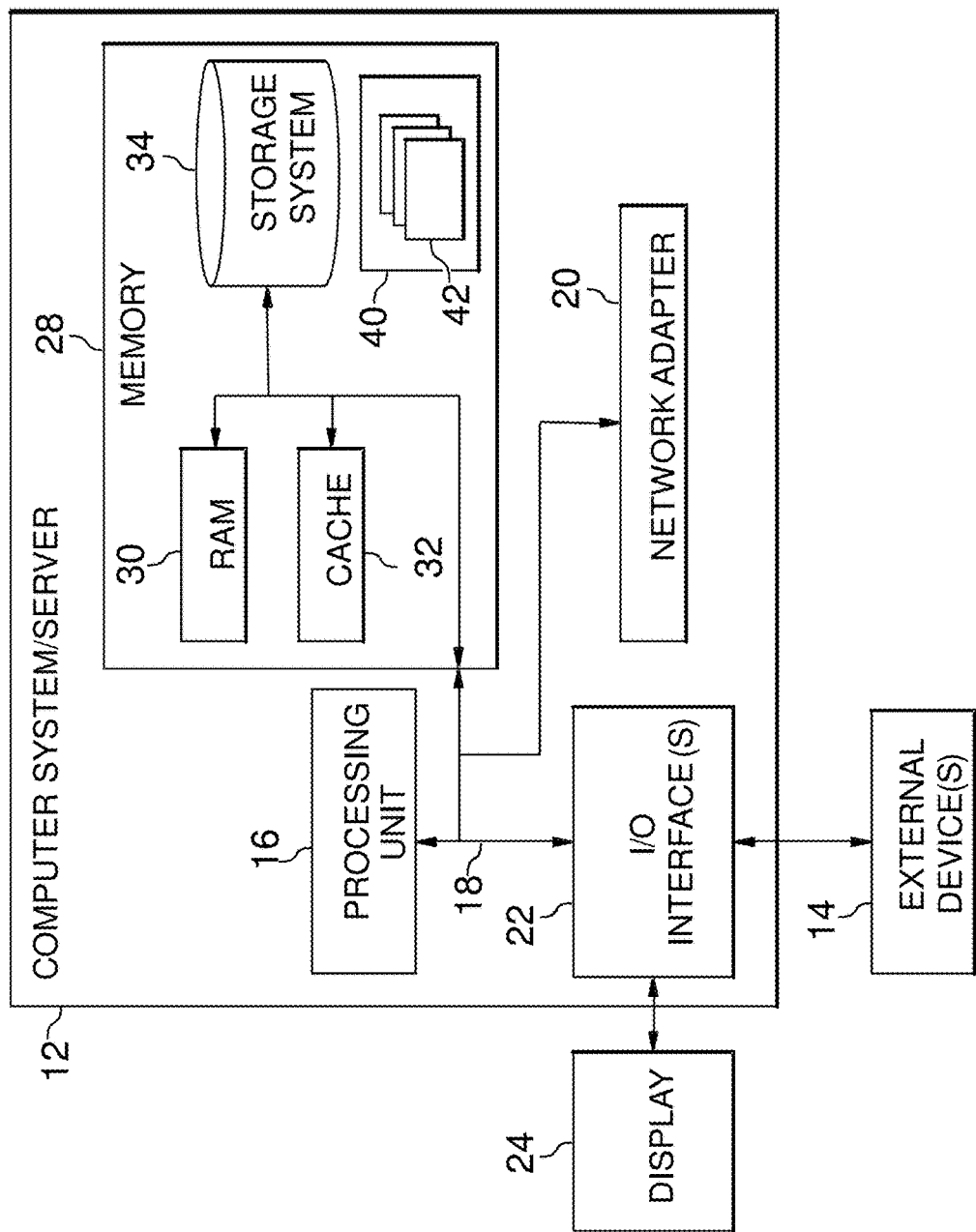
FIG. 1 depicts a cloud computing node according to an embodiment of the present invention.

The present invention generally relates to providing relevant and authentic channel content to users and, more particularly, to providing relevant and authentic channel content to users based on user persona and interest. Thousands or more audio artifacts related to internet-based media channels are available for users to cater to users' varying interests. Social media-based channels are formed by users of similar interest across geographies to interact and enjoy a shared experience surrounding content (e.g., transient or non-transient content) of a particular topic with which the users share an interest. However, a user interested in potentially subscribing to a channel might not know (a) if the channel is to their liking, and (b) if the activities/topics of the channel are indeed what they claim to be. For example, the channel might be a spam or a fake to attract unsuspecting users or the channel content may digress from the user's interest. Accordingly, aspects of the present invention authenticate the content of a channel to verify that the channel is authentic with respect to the channel's description and published attributes. Further, aspects of the present invention provide a list of channels in which a user is interested to subscribe based on matching persona profiles of different channels with a persona profile of the user.

In embodiments, aspects of the present invention improve filtering and content suggestion techniques in the field of consumable online content sharing. For example, unlike current systems, aspects of the present invention authenticate channels and provide guidance for generating and/or modifying content (e.g., hosted on a content provider's platform or channel) based on feedback such as content trustworthiness, aggregate personality trait information of content subscribers, user interest, etc. As an illustrative, non-limiting example, aspects of the present invention provide feedback related to the trustworthiness of content, as well as mathematical representations of the evolving aggregate personality traits and interests of users subscribed to the channel. This feedback provides guidance for modifying content to improve the popularity of content to better align with the evolving interests and personalities of content consumers. Additionally, or alternatively, in embodiments, this feedback is used to improve content suggestions, thus improving content popularity and user experience.

As described herein, aspects of the present invention generate and maintain an up-to-date user persona profile based on the user's interests with regard to different types of content, social media activity, user trustworthiness/ratings, user behavior data, etc. Aspects of the present invention further generate and maintain an up-to-date channel persona profile based on the attributes of content included in the channel and the user persona profiles of users subscribed to the channel. For example, the persona of the channel changes over time as the content of the channel evolves and/or as different users subscribe-unsubscribe from the channel. Aspects of the present invention further generate a memento that captures the details of a user's experience when accessing a channel and/or interacting with other users while viewing/listening to channel content. The memento is used to update the user's persona profile with up-to-date information capturing the user's interest. The updated persona profile for the user is used to generate better matches for other channels with which the user is interested.

As described herein, aspects of the present invention authenticate new channels, identify and suggest relevant channels for which a user is interested, maintain persona profiles for the user and the channel, and provide updated channel recommendations as the user's personal profile and/or the persona profile of different channels change over time. In this way, users are given an opportunity to quickly identify a list of channels most relevant to them as the user's interests change over time and as the persona of the channel changes over time (e.g., as the content of the channel changes over time and/or as the persona of the individuals that subscribe and unsubscribe from the channel change over time). Further, channel administrators may use channel persona profile information to modify the content of their channel to more closely match the persona profile of subscribed users (e.g., to retain existing users, attract additional users with a similar persona profile, etc.).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
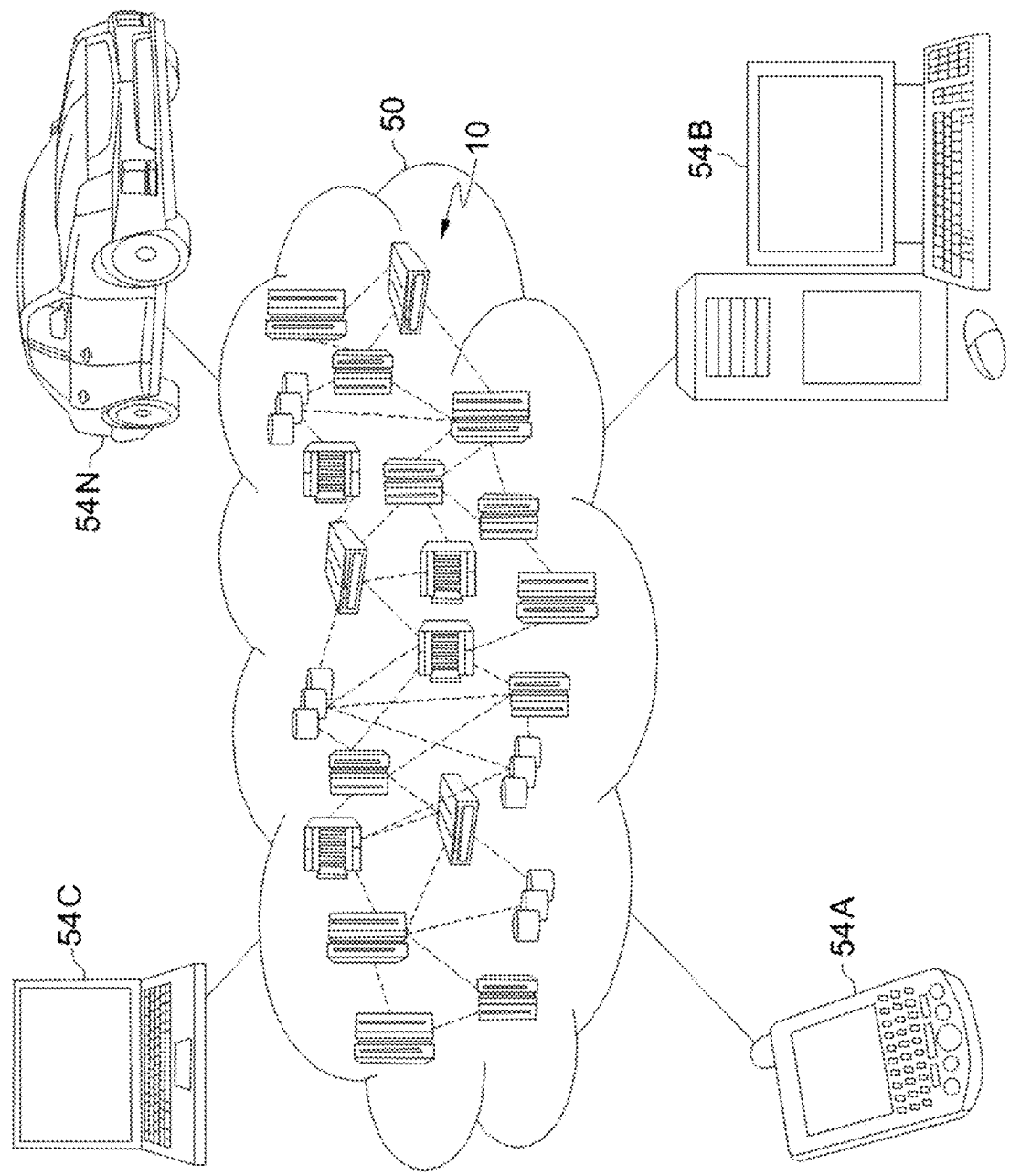
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
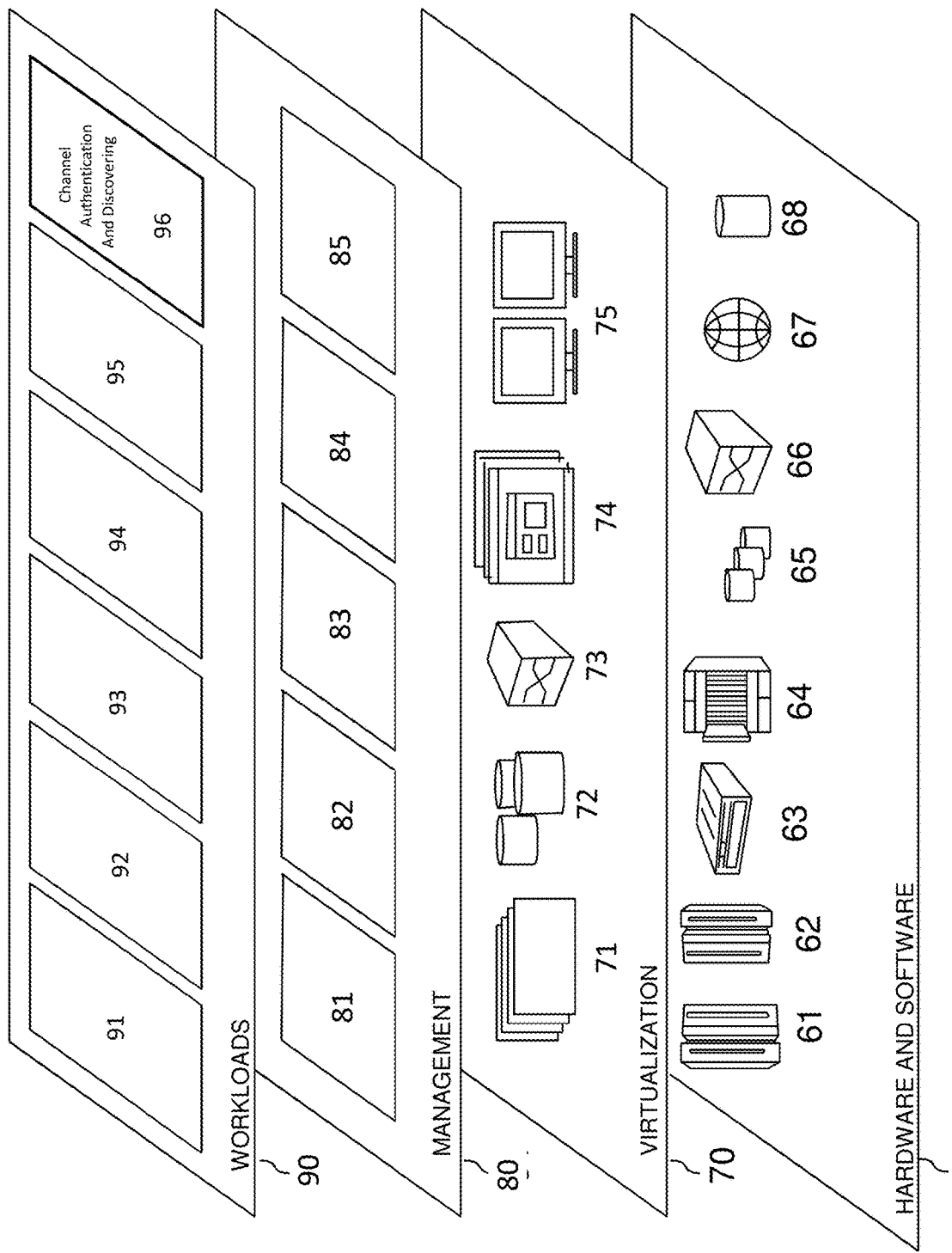
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and channel authentication and discovering 96.

Referring back to FIG. 1, the program/utility 40 includes one or more program modules 42 that generally carry out the functions and/or methodologies of embodiments of the invention as described herein (e.g., such as the functionality provided by channel authentication and discovering 96). Specifically, the program modules 42 receive a request to host content for a channel (e.g., transient or non-transient content), authenticate the content, generate and maintain user persona profiles, generate and maintain channel persona profiles, match the user persona profiles with the channel persona profiles to generate channel recommendations, and generate a memento for a user session and use the memento to update the user's persona profile. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 are representative of a channel management system 215 shown in FIG. 4.

Figure 4:
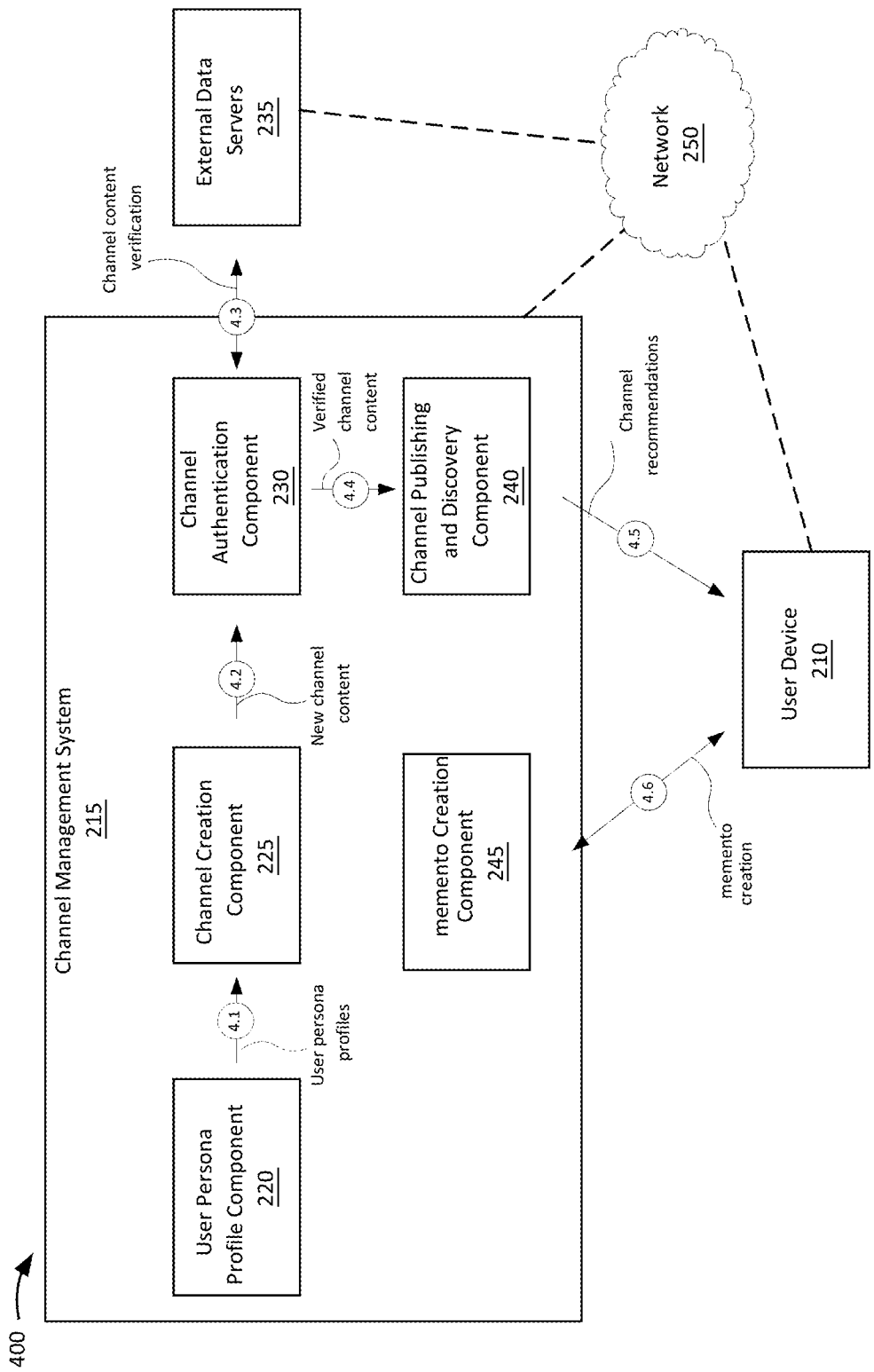
FIG. 4 shows an overview and environment of an example implementation in accordance with aspects of the present invention

FIG. 4 shows an overview and environment of an example implementation in accordance with aspects of the present invention. As shown in FIG. 4, environment 400 includes a user device 210, a channel management system 215, one or more external data servers 235, and a network 250. In embodiments, one or more components in environment 400 may correspond to one or more components in the cloud computing environment of FIG. 2. In embodiments, one or more components in environment 400 includes the components of computer system/server 12 of FIG. 1.

The user device 210 includes a computer device capable of communicating via a network, such as the network 250. For example, the user device 210 corresponds to a mobile communication device (e.g., a smart phone or a personal digital assistant (PDA)), a portable computer device (e.g., a laptop or a tablet computer), a desktop computing device, a wearable computing device, or another type of device. The user device 210 is used to access channels and content hosted by the channel management system 215 and capture user behavior/biometrics data that indicates user interest levels while viewing/listening to content from channels.

The channel management system 215 includes one or more computing devices (e.g., such as computer system/server 12 of FIG. 1). As further shown in FIG. 4, the channel management system 215 includes a user persona profile component 220, a channel creation component 225, a channel authentication component 230, a channel publication and discovery component 240, and a memento creation component 245. The channel management system 215 implements core processes of aspects of the present invention, as described herein. The external data server 235 includes one or more computing devices (e.g., such as computer system/server 12 of FIG. 1) that host web pages and/or other data that is used by the channel management system 215 to verify/validate content from one or more channels hosted by the channel management system 215.

The network 250 includes network nodes, such as network nodes 10 of FIG. 2. Additionally, or alternatively, the network 250 includes one or more wired and/or wireless networks. For example, the network 250 includes a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 250 includes a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 400 is not limited to what is shown in FIG. 4. In practice, the environment 400 includes additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400. Devices of the environment 400 may interconnect via wired connections, wireless connections, or a combination of wired and wireless connections.

As further shown in FIG. 4, the user persona profile component 220 provides user persona profiles to the channel creation component 225 (e.g., at step 4.1). For example, the user persona profile component 220 generates and maintains user persona profiles in which each user persona profile identifies the user's interest, social media reputation/trustworthiness, user behavior data, etc. Additional details regarding the generation of user persona profiles is discussed in greater detail below with respect to FIG. 5.

The channel creation component 225 receives the user personal profiles and generates new channel content based on the user persona profiles (e.g., new content for an existing channel or a new channel altogether). In embodiments, the channel creation component 225 receives an instruction to generate new channel content from a channel administrator in which the channel administrator uses information from the user persona profiles (generated at step 4.1) and design a channel around certain types of user personas. Additionally, or alternatively, the channel creation component 225 automatically generates new channel content based popular user personas in which the channel creation component 225 generates a channel having content that matches the interests of users with a particular type of user persona. At step 4.2, the channel creation component 225 provides the new channel content to the channel authentication component 230.

At step 4.3, the channel authentication component 230 communicates with one or more external data servers 235 to verify the authenticity of the new channel content. For example, as described in greater detail with respect to FIG. 6, the channel authentication component 230 extracts audio and/or video data of the content, determines whether the information in the audio is accurate by transcribing the audio and/or applying natural language processing to the audio, and verifies that the information discussed in the audio is accurate by communicating with the external data servers 235. Additionally, or alternatively, the channel authentication component 230 may apply video/image analysis techniques to determine whether the image described in the audio relates to what is shown in the video. In this way, spam related content and/or inaccurate content can be filtered out and prevented from being published.

At step 4.4, the channel authentication component 230 provides the verified channel content to the channel publication and discovery component 240 for publishing the channel content. In embodiments, the channel publication and discovery component 240 determines attributes and persona of the channel content. In aspects, the channel publication and discovery component 240 maintains the persona of the channel content over a period of time. At step 4.5, the channel publication and discovery component 240 provides, to a user device 210 that accesses the channel management system 215, channel recommendations based on the persona of channels hosted by the channel management system 215 and based on the persona of the user associated with the user device 210. Further, as a user interacts within a channel (e.g., accesses audio/video content, engages in discussions with other users), the memento creation component 245 tracks the user's interactions and generate a memento during an interactive session (e.g., at step 4.6). In embodiments, memento is used to identify points/time indexes of interest for content, generate a collage of the points of interest, used for recollection to be referenced at a later time, and/or used to update the user's persona profile and interests.

In embodiments, the user persona profile component 220 maintains and update the user's persona profile and the channel publication and discovery component 240 maintains and update the persona profile of a channel as more content to the channel is added and as users subscribe and unsubscribe from the channel. For example, the channel persona profile is based on the attributes of content added or removed from the channel over time, and/or the aggregate user persona profiles of the subscribed users. As the channel persona profile evolves, the discovery recommendations provided by the channel publication and discovery component 240 changes to stay up to date with a user's persona and interest. Further, a channel administrator adjusts content accordingly to more closely align the channel persona profile with that of the persona profile of the users subscribed to the channel. In this way, user retention and channel popularity are improved.

Figure 5:
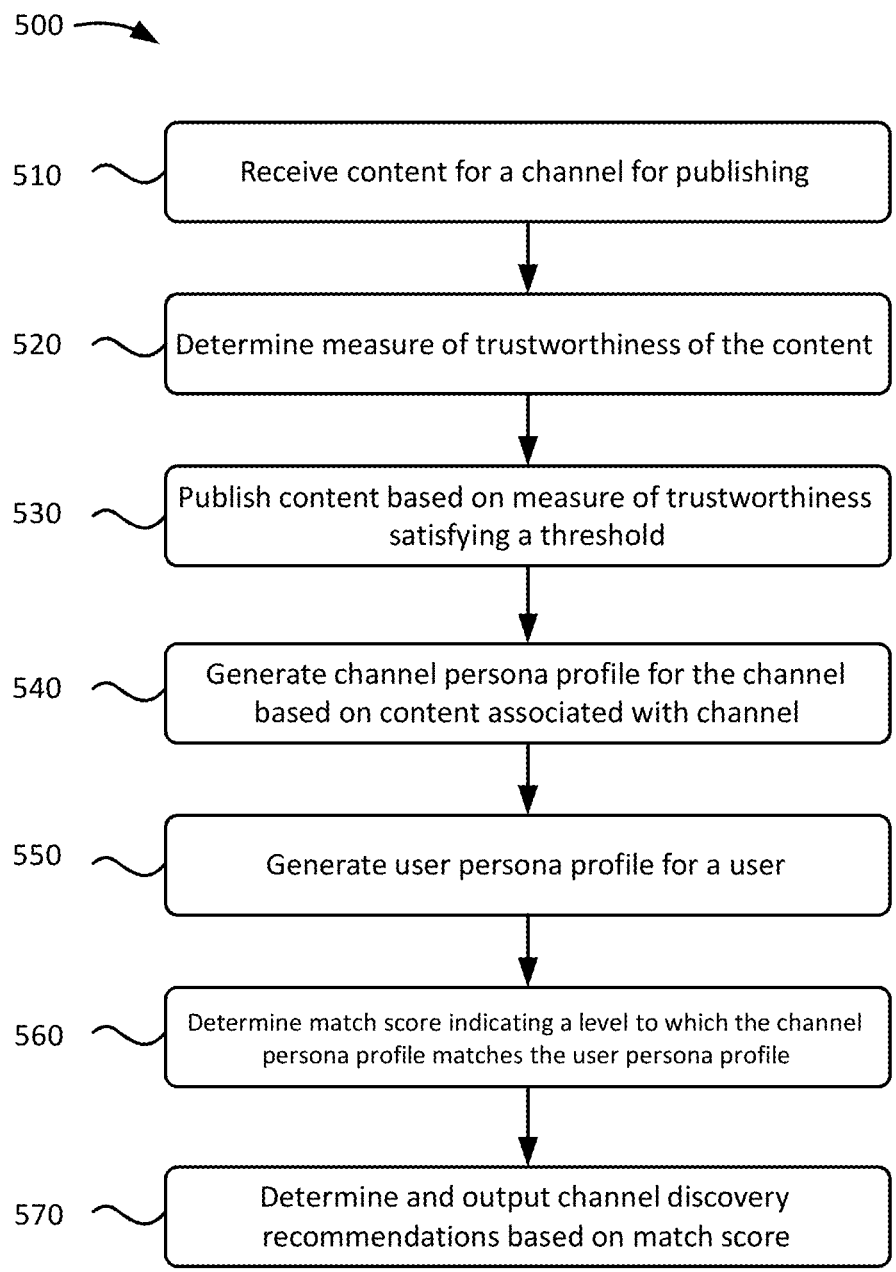
FIG. 5 shows an example flowchart of a process for providing channel discovery recommendations based on a match score indicating a level to which a channel persona profile matches a user persona profile in accordance with aspects of the present invention.

FIG. 5 shows an example flowchart of a process for providing channel discovery recommendations based on a match score indicating a level to which a channel persona profile matches a user persona profile. The steps of FIG. 5 are implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 5, process 500 includes receiving content for publishing (step 510). For example, the channel authentication component 230 receives channel content for publishing from the channel creation component 225 (e.g., by a user or channel administrator that uploads the content channel metadata, and description). Additional details regarding receiving the content for publishing are described with respect to process step 710 in FIG. 7.

Process 500 further includes determining a measure of trustworthiness of the content (step 520). For example, the user persona profile component 220 generates a trustworthiness score that indicates the level to which the channel content (e.g., received at step 510) is trustworthy (e.g., authentic, not spam, etc.). Additional details regarding the determining the measure of trustworthiness are described in greater detail below with respect to process steps 720-760 in FIG. 7.

Process 500 also includes publishing content based on the measure of trustworthiness satisfying a threshold (step 530). For example, the user persona profile component 220 compares the trustworthiness score (determined at step 660) with a predefined and configurable threshold. The user persona profile component 220 publishes the content to the channel publication and discovery component 240 when the trustworthiness score satisfies the threshold, thus preventing untrustworthy content from being published. Additional details regarding the determining the measure of trustworthiness are described in greater detail below with respect to process step 770 in FIG. 7.

Process 500 further includes generating a channel persona profile for the channel based on the content associated with the channel (step 540). For example, the channel publication and discovery component 240 generates a channel persona profile that includes a persona vector that models the persona of a channel (e.g., a channel created at step 510) and the persona of users that are interested in subscribing to the channel. Additional details regarding the generating the channel persona profile are described in greater detail below with respect to process step 810 in FIG. 8.

Process 500 also includes generating a user persona profile for a user (step 550). For example, the user persona profile component 220 generates the user's persona profile based on trustworthiness of content contributed by the user, appropriateness of content contributed by the user, the users' reputation, the user's interest, and/or other information relating to the user's persona. Additional details regarding the generating the user's persona profile are described in greater detail below with respect to process steps 610-660 in FIG. 6.

Process 500 further includes determining a match score indicating a level to which the channel persona profile matches the user persona profile (step 560). For example, the channel publication and discovery component 240 matches the channel persona profile (e.g., generated at process step 540) to user persona profiles (e.g., generated at process step 550) to generate a match score for each user persona profile. The match score is relatively higher when the details in the channel persona vector more closely match the details in the user persona vector. In other words, the match score measures the level to which the channel persona profile matches the user persona profile. Additional details regarding the determining the match score are described in greater detail below with respect to process step 820 in FIG. 8.

Process 500 also includes determining and outputting channel discovery recommendations based on the match score (step 570). For example, the channel publication and discovery component 240 outputs, for a user, channel discovery recommendations that identify channels that a user is interested in subscribing. In embodiments, the channel discovery recommendations are a ranked list in order of match score (e.g., as determined at step 560). Additional details regarding the determining and outputting channel discovery recommendations are described in greater detail below with respect to process step 830 in FIG. 8.

Figure 6:
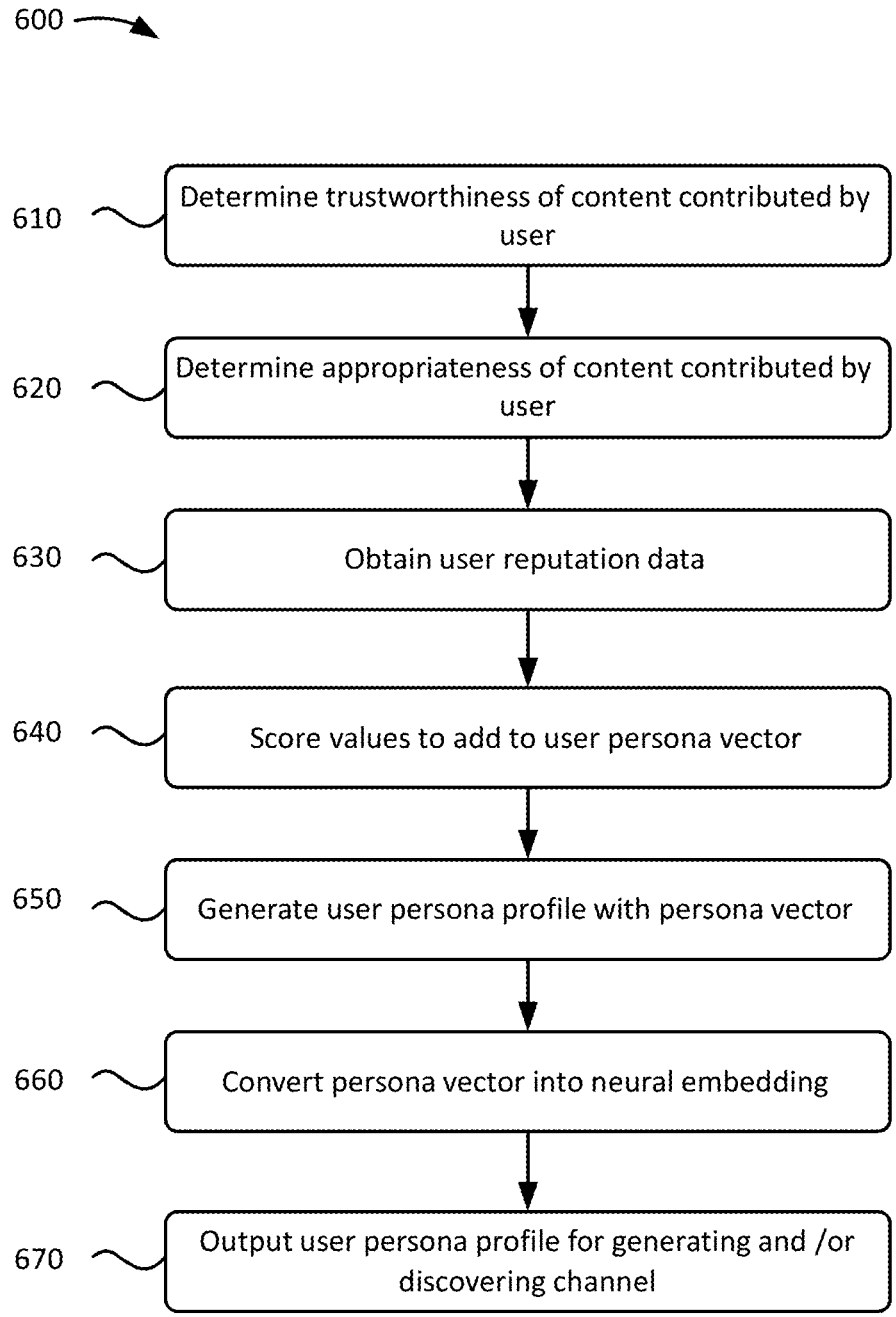
FIG. 6 shows an example flowchart of a process for generating a user persona profile and using the user persona profile to generate and/or discover channels in accordance with aspects of the present invention.

FIG. 6 shows an example flowchart of a process for generating a user persona profile and using the user persona profile to generate and/or discover channels. The steps of FIG. 6 are implemented in the environment of FIG. 6, for example, and are described using reference numbers of elements depicted in FIG. 6. As noted above, the flowchart illustrates the architecture, functionality, and operation of possible implementations of systems, methods, and computer program products according to various embodiments of the present invention.

As shown in FIG. 6, process 600 includes determining a trustworthiness of content contributed by the user (step 610). For example, the user persona profile component 220 determines a trustworthiness of content contributed by the user (e.g., text in social media or public conversations). In embodiments, the text is scanned for strong messages (e.g., containing nouns referring to a verifiable fact). In embodiments, subject, predicate, and/or object is extracted out of these strong messages, and is verified against web knowledge bases (e.g., external data servers 235) for trustworthiness. The accuracy of the strong messages is used to score trustworthiness of the content contributed by the user Process 600 also includes determining appropriateness of content contributed by user (step 620). In embodiments, appropriateness of content refers to a level of civility, politeness, vulgarity, etc. For example, the user persona profile component 220 may analyze content contributed by user (e.g., comments, messages, etc. in a social media setting). In embodiments, the user persona profile component 220 performs sentiment analysis, tone analysis, and/or other type of natural language processing to determine the aggregate appropriateness of all of the user's contributed content. In embodiments, the user persona profile component 220 may compare the text with a database of blacklisted text/topics and determine a measure of appropriateness based on the number of blacklisted words/topics included in the user's contributed content.

Process 600 further includes obtaining user reputation data (step 630). For example, the user persona profile component 220 obtains user reputation data with respect to other users using scoring techniques such as mutual user ratings.

Process 600 also includes scoring values to add to the user's persona vector (step 640). For example, the user persona profile component 220 scores values related to the user's trustworthiness (from step 610), the user's appropriateness (from step 620), the user's reputation (from step 630), and/or other values for other factors. The scored values are incorporated into a user persona vector as described herein.

Process 600 further includes generating the user's persona profile with the persona vector (step 650). For example, the user persona profile component 220 generates the user's persona profile with the persona vector. In embodiments, the persona vector contains fields which are selected from the similarity in the individual user characteristics such as mood, physical location, ambience (scenes, monuments, route, noise level etc.), activity (walking, sitting, jogging, driving, commuting, sleeping etc.). Intent expressed in physical and messenger conversations are mapped to popular topics mined from knowledge bases (e.g., hosted by the external data servers 235). In embodiments, the persona vector also identifies the user's interests as determined using any suitable technique.

Process 600 also includes converting the persona vector into a neural embedding (step 660). For example, the user persona profile component 220 implements an auto-encoder to learn a representation for the above features derived at steps 610-650, such as trustworthiness of content, appropriateness of the content, user reputation data, user persona vector, and/or user person profile. In embodiments, the auto-encoder learns a representation for the features embedded in a unique signature of each use or session accessing a channel hosting the content. In embodiments, the auto-encoder is an artificial neural network that learns a compressed, distributed representation of the features. The representations are learned in such a way that the they are able to reconstruct the original features. This self-reconstruction technique aids in deriving meaningful representations for a given dataset. Once users are represented in this basic neural embedding representation, similar users having high similarity in the derived features will lie near to each other in an N-dimensional space model. Given a specific trust requirement (e.g., a score threshold), users within the N-dimensional clusters within the model who do satisfy the threshold are filtered out.

Process 600 further includes outputting the user persona profile for generating and/or discovering channels (step 670). For example, the user persona profile component 220 outputs the user persona profile and add the user persona profile to a collection of multiple user persona profiles. This collection is used to generate new channel content to match the persona of a collection of user personas of a particular type. Additionally, or alternatively, a user persona profile is used to discover channels for a user that the user is interested (e.g., based on a degree to which the user's persona profile matches the channel's persona profile).

Figure 7:
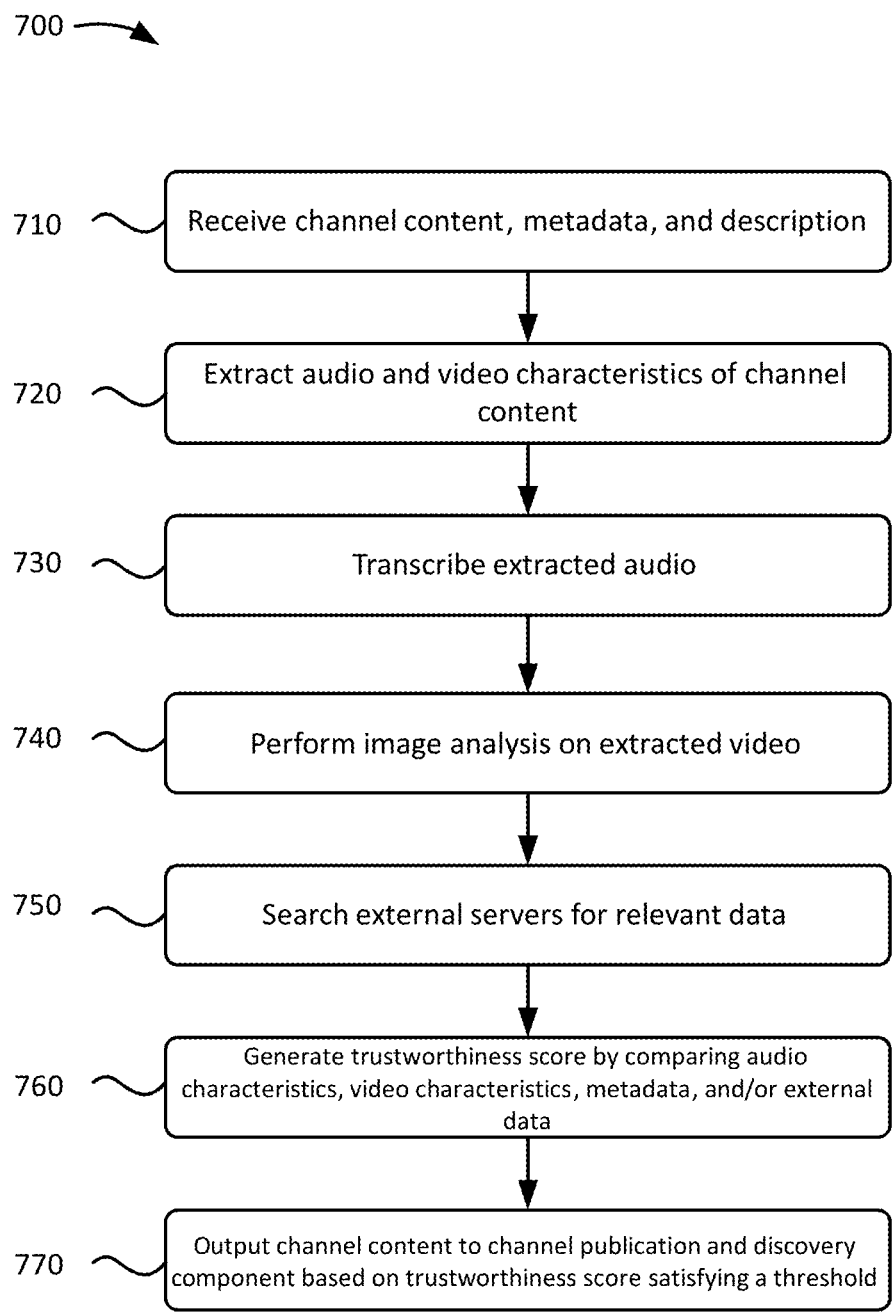
FIG. 7 shows an example flowchart of a process for generating a trustworthiness score for a channel in accordance with aspects of the present invention.

FIG. 7 shows an example flowchart of a process for generating a trustworthiness score for a channel. The steps of FIG. 7 are implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 7, process 700 includes receiving channel content, channel metadata, and description (step 710). For example, the channel authentication component 230 receives channel content for publishing, metadata for the content, and description of the content from the channel creation component 225 (e.g., by a user or channel administrator that uploads the content channel metadata, and description). As described herein, a channel administrator creates a channel using user persona profiles (e.g., user persona profiles generated at process step 650). When creating the channel, the channel administrator inputs metadata and a description of the channel.

Process 700 also includes extracting metadata, audio, and video characteristics of channel content (step 720). For example, the user persona profile component 220 extracts audio and video characteristics of the channel content (e.g., from step 710) using beats pattern using hit point analysis, frequency patterning using spectrum analysis, amplitude pattern using loudness analysis, or the like. In embodiments, a unique signature for the channel content is created and stored using the extract characteristics.

In embodiments, content and metadata features are extracted from the content. For example, extracting content features includes classifying the audio content into classes using any suitable classification technique. Examples include speeches, lectures, discussions, songs instrumentals, animal sounds etc. In embodiments, the lyrics of the content are transcribed and tokenized to identify features such as strong words, conversations, topics, speaker identities (if available), mood of the content, nature of the content, etc. Further, a feature set is constructed from the extracted content features. In embodiments, metadata features are also extracted. Metadata features include textual information mined from the comments, transcripts, accompanying slides viewer feedback (like/dislike), views, audio annotations etc. In embodiments, metadata is parsed to extract the nature of the content, its popularity across demographics and interest groups. In embodiments, the feature sets from content and metadata features are combined with the sound characteristic features to create a feature vector.

Process 700 further includes transcribing the extracted audio (step 730). For example, the user persona profile component 220 transcribes the extracted audio using any suitable audio transcription technique to identify the lyrics and/or words of the audio. As described herein, the lyrics of the content is transcribed and tokenized to identify features such as strong words, conversations, topics, speaker identities (if available), mood of the content, nature of the content, etc.

Process 700 also includes performing image analysis on the extracted video (step 740). For example, the user persona profile component 220 performs image analysis on the extracted video using any suitable image analysis technique (e.g., pixel-based classification, object detection, etc.). As described herein, the extracted video is used to determine if the video content is relevant to the lyrics and/or words of the audio (e.g., obtained at step 730) and/or the channel metadata/description (e.g., obtained at step 710).

Process 700 further includes searching external servers for relevant data (step 750). For example, the user persona profile component 220 searches the external data servers 235 (e.g., knowledge bases, message boards, etc.) for relevant data associated with the extracted audio and/or video. In embodiments, the user persona profile component 220 uses any suitable searching system in which search queries includes words from the transcribed audio and/or references to objects, individuals, etc. identified from the extracted video. As described herein, the user persona profile component 220 searches the external data servers 235 to determine whether the audio and video is related to each other, and to determine whether the information in the content is accurate (e.g., trustworthy).

Process 700 also includes generating a trustworthiness score by comparing the audio characteristics, video characteristics, metadata, and/or external data (step 760). For example, the user persona profile component 220 generates a trustworthiness score that indicates the level to which the channel content is trustworthy (e.g., authentic, not spam, etc.). In embodiments, the user persona profile component 220 generates the trustworthiness score by comparing the audio characteristics (e.g., transcribed audio), video characteristics (e.g., identified individuals, objects, subjects, etc. from the video), metadata, and/or external data (e.g., knowledge bases). As an example, the user persona profile component 220 generates a relatively high trustworthiness score when the audio transcription matches the content in the video, the metadata, and has accurate information closely corresponding information from knowledge base. As another example, the user persona profile component 220 generates a relatively low trustworthiness score when the audio transcription does not match the content in the video, the metadata, and has inaccurate information closely corresponding information from knowledge base.

Process 700 further includes outputting the channel content to the channel publication and discovery component based on the trustworthiness score satisfying a threshold (step 770). For example, the user persona profile component 220 compares the trustworthiness score (determined at step 760) with a predefined and configurable threshold. The user persona profile component 220 publishes the content to the channel publication and discovery component 240 when the trustworthiness score satisfies the threshold, thus preventing untrustworthy content from being published.

Figure 8:
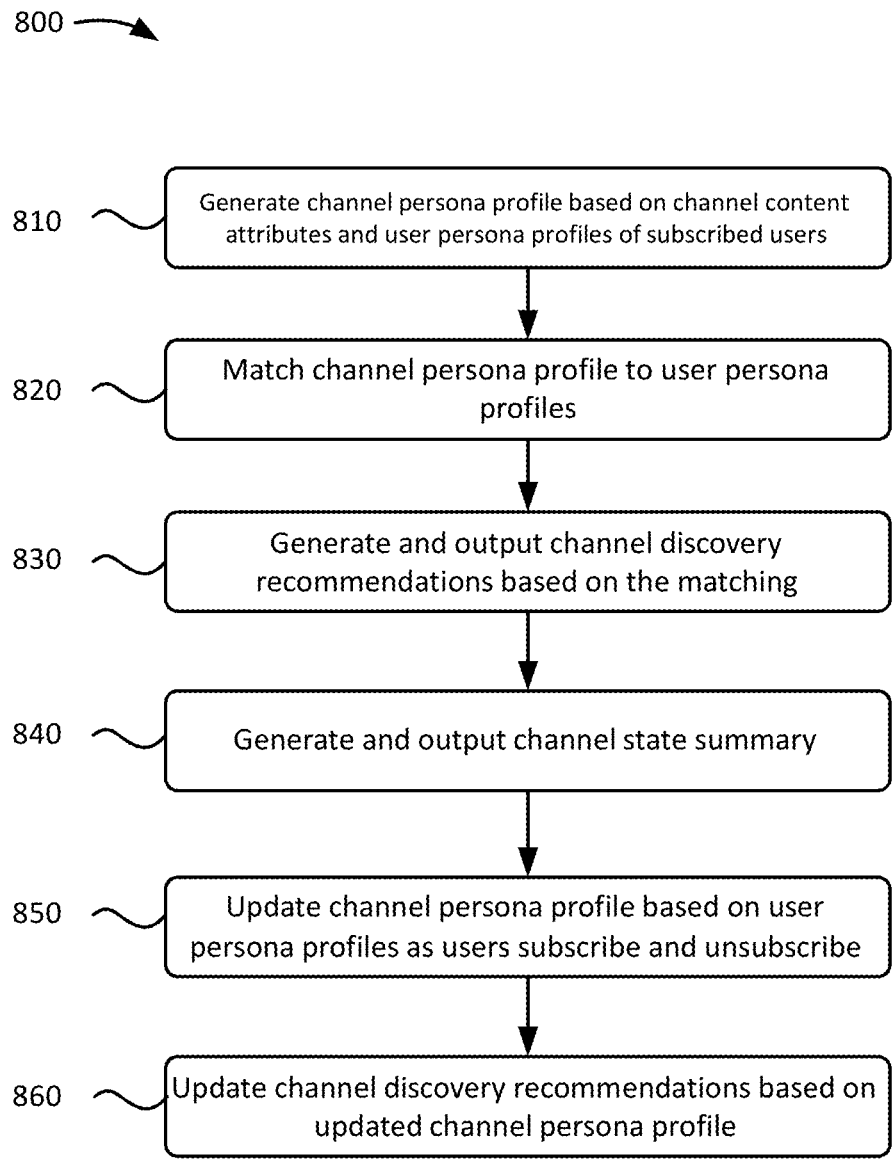
FIG. 8 shows an example flowchart of a process for generating a channel persona profile and generating discovery recommendations based on the channel persona profile and user persona profiles in accordance with aspects of the present invention.

FIG. 8 shows an example flowchart of a process for generating a channel persona profile and generating discovery recommendations based on the channel persona profile and user persona profiles. The steps of FIG. 8 are implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 8, process 800 includes generating a channel persona profile based on the channel content attributes and user persona profiles of subscribed users (step 810). For example, the channel publication and discovery component 240 generates a channel persona profile that includes a persona vector that models the persona of a channel (e.g., a channel created at step 610) and the persona of users that are interested in subscribing to the channel. As described herein, the channel persona profile is based on attributes/characteristics of the content associated with the channel (e.g., the metadata/description of the content, trustworthiness of the content, content subjects, types of content, user discussions within the channel regarding the content, etc.). In embodiments, the attributes/characteristics of the content associated with the channel are obtained (e.g., using process steps 720-740) and stored in a feature vector for the content. In embodiments, the feature vector is used to generate the channel persona profile. Additional details regarding the feature vector are described in greater detail with respect to FIG. 10. In embodiments, the channel persona profile is further based on the user persona profiles of users currently subscribed to the channel. For example, the channel persona profiles includes an aggregate or weighted average of the personas and/or attributes from the persona vectors of the users subscribed to the channel. Additionally, or alternatively, the channel persona profile is further based on persona profiles of target users that a channel administrator wishes to attract.

Process 800 also includes matching the channel persona profile with user persona profiles (step 820). For example, the channel publication and discovery component 240 matches the channel persona profile to user persona profiles (e.g., generated at step 650) to generate a match score for each user persona profile. The match score is relatively higher when the details in the channel persona vector more closely match the details in the user persona vector. In other words, the match score measures the level to which the channel persona profile matches the user persona profile.

Process 800 further includes generating and outputting channel discovery recommendations based on the matching (step 830). For example, the channel publication and discovery component 240 outputs, for a user, channel discovery recommendations that identify channels that a user is interested in subscribing. In embodiments, the channel discovery recommendations are a ranked list in order of match score.

Process 800 also includes generating and outputting a channel state summary (step 840). For example, the channel publication and discovery component 240 generates a channel state summary that includes a summary of channel content featured within the channel and user discussions regarding the content. The channel state summary includes information that assists a user in deciding whether the user wishes to subscribe to the channel.

As an illustrative, non-limiting example, the channel state summary identifies that the channel largely includes violin tunes as opposed to conversation between members about violins. A user may consider joining or subscribing to the channel because the user is interested in listening to music featuring violins. On the other hand, if the channel content is dominated by violin lesson instructions, then the user may not be interested in the channel. In this way, the channel state summary assists the user to decide whether the user wishes to join the channel, and whether the user wishes to and quickly participate in the channel activity. The channel state summary identifies the match level of the channel with the user. In this particular example, the channel state summary identifies the proportion of conversations to tunes.

In embodiments, the personalized channel state summary is generated by modeling the conversations and audio of the content for topics matching the user's persona profile. If such topics exist, then the conversations related to that are sampled for the summary. Additionally, or alternatively, the audio content features (e.g., obtained at step 620) are also added to the channel state summary. A trust score is generated from the users of the channel and their activity and included in the channel state summary.

Process 800 also includes updating the channel persona profile based on user persona profiles as users subscribe and unsubscribe (step 850). For example, the channel publication and discovery component 240 updates the channel persona profiles by re-generating the channel persona profile with consideration to the persona vectors of the user persona profiles of those users who have recently subscribed to the channel, while deleting the data from the persona vectors of users that have unsubscribed to the channel.

Process 800 further includes updating the channel discovery recommendations based on the updated channel persona profile (step 860). For example, the channel publication and discovery component 240 generates updated channel discovery recommendations by regenerating the channel discovery recommendations after updating the channel persona profile. In this way, the channel discovery recommendations are updated as the channel's persona evolves over time. Additionally, or alternatively, a channel administrator adjusts the content of the channel to more closely align with a desired channel persona and to retain and/or attract users of a particular persona.

Figure 9:
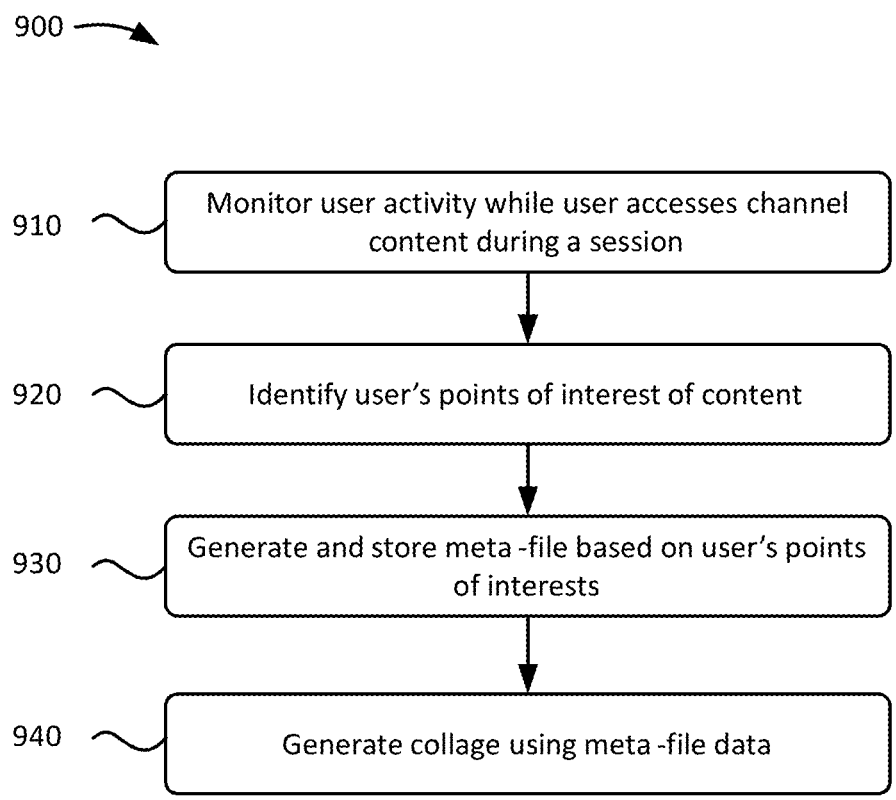
FIG. 9 shows an example flowchart of a process for generating a memento based on the user's activity within a channel in accordance with aspects of the present invention.

FIG. 9 shows an example flowchart of a process for generating a memento based on the user's activity within a channel. The steps of FIG. 9 are implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 9, process 900 includes monitoring user activity while a user access channel content during a session (step 910). For example, the memento creation component 245 monitors various activities of the user. In embodiments, the memento creation component 245 monitors the various user activities by periodically receiving and/or storing data from the user device 210, such as data from wearable computing devices, camera devices, microphone devices relating to conversations about the content, etc.) during a session in which the user is accessing channel content (e.g., an IP-based session in which the user has selected to play back the channel content).

Process 900 also includes identifying points of interest in the content (step 920). For example, the memento creation component 245 identifies user activity that is directly of interest to the user (e.g., the user's conversation, gestures) or indirectly of interest to the user (e.g., other users speaking about a topic in which the user is interested) while the user is listening to, viewing, and/or otherwise accessing the content (e.g., from step 910).

Process 900 further includes generating and storing a meta-file based on user's points of interest (step 930). For example, the memento creation component 245 generates a personalized memento including a meta-file accompanying the content. In embodiments, the meta-file is personalized with respect to the user's persona profile and participation/activity including the trustworthiness/influence score of the responses from other users. Additionally, or alternatively, the meta-file contains references to the content. In embodiments, the meta-file is used as a data store which is referenced and relevant data retrieved whenever the user makes a reference to a topic identified in the memento in later conversations or interactions.

Process 900 also includes generating a collage using the meta-file data (step 940). For example, the memento creation component 245 generates an audio/video collage with the conversations, gestures and interactions, In embodiments, the audio/video collage includes visuals identifying the user's points of interest (from step 930) and an audio track which includes the audio within the content (e.g., the content at step 910).

Figure 10:
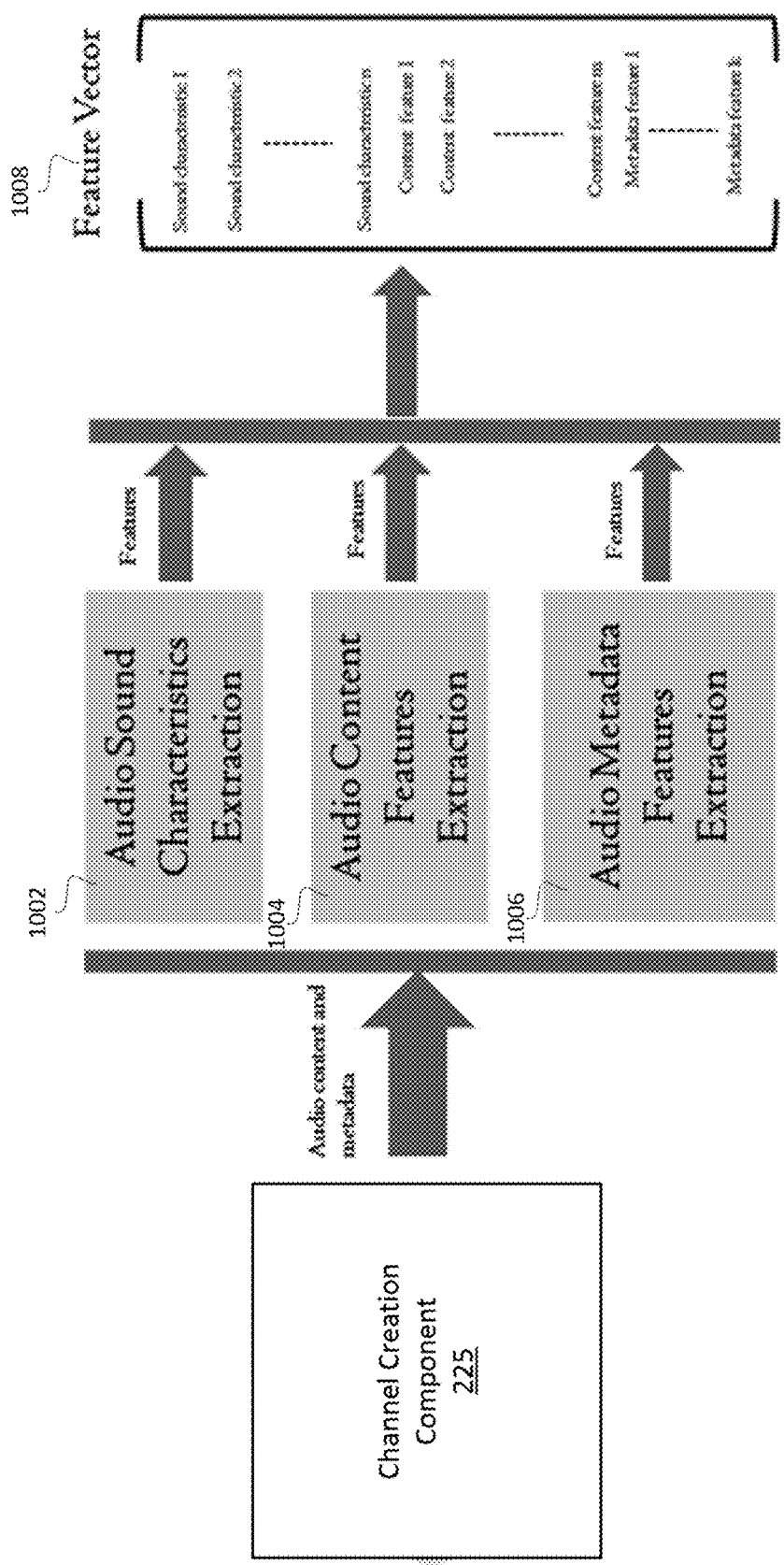
FIG. 10 illustrates an example of extracting sound characteristics, content features, and metadata features in accordance with aspects of the present invention.

FIG. 10 illustrates an example of extracting sound characteristics, content features, and metadata features in accordance with aspects of the present invention. In embodiments, the user persona profile component 220 extracts audio sound characteristics 1002, audio content features 1004, and audio metadata features 1006 from audio content (e.g., audio content from a channel produced by the channel creation component 225 for example, at step 710) for example, in a similar manner as described above with respect to process step 720 in FIG. 7. As shown in FIG. 10, audio sound characteristics 1002, audio content features 1004, and audio metadata features 1006 are extracted to form a feature vector 1008 in which the feature vector 1008 identifies, in a structured manner, the sound characteristics, content features, and metadata features. In embodiments, the feature vector 1008 is used for channel discovery and/or generating trustworthiness score of the channel content as described above with respect to process 700 in FIG. 7. In embodiments, the feature vector 1008 corresponds to the feature vector described at step 720.

Figure 11:
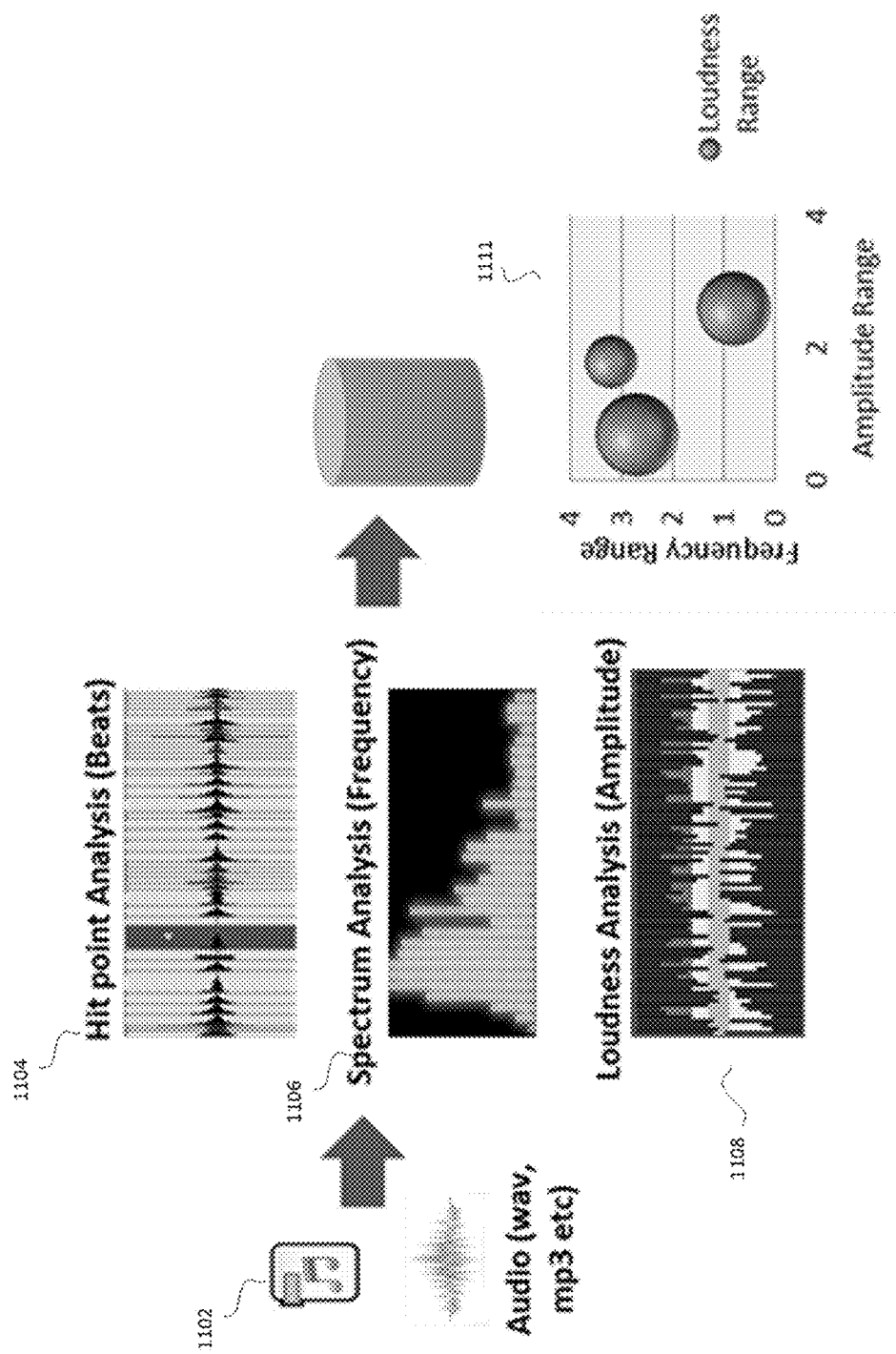
FIG. 11 illustrates an example of extracting sound characteristics from an audio file in accordance with aspects of the present invention.

FIG. 11 illustrates an example of extracting sound characteristics from an audio file in accordance with aspects of the present invention. In embodiments, the user persona profile component 220 extracts the sound characteristics of audio content 1102 produced by the channel creation component 225 in a similar manner as described above with respect to step 620 (e.g., to generate a feature vector as described above with respect to FIG. 9). Additionally, or alternatively, the user persona profile component 220 extracts the sound characteristics of an audio file in a user's library (e.g., as part of determining the user's persona vector based on the sound characteristics of audio files in the user's library). As shown in FIG. 11, sound characteristics are extracted using hit point analysis 1104 (e.g., beats analysis), spectrum analysis 1106 (e.g., frequency analysis), loudness analysis 1108 (e.g., amplitude analysis), etc. In embodiments, the frequency and range are plotted and incorporated as part of the user's persona vector (e.g., as shown in graph 1110). In embodiments, the sound characteristics are stored in the user's persona vector and/or stored in another location for future use.

Figure 12:
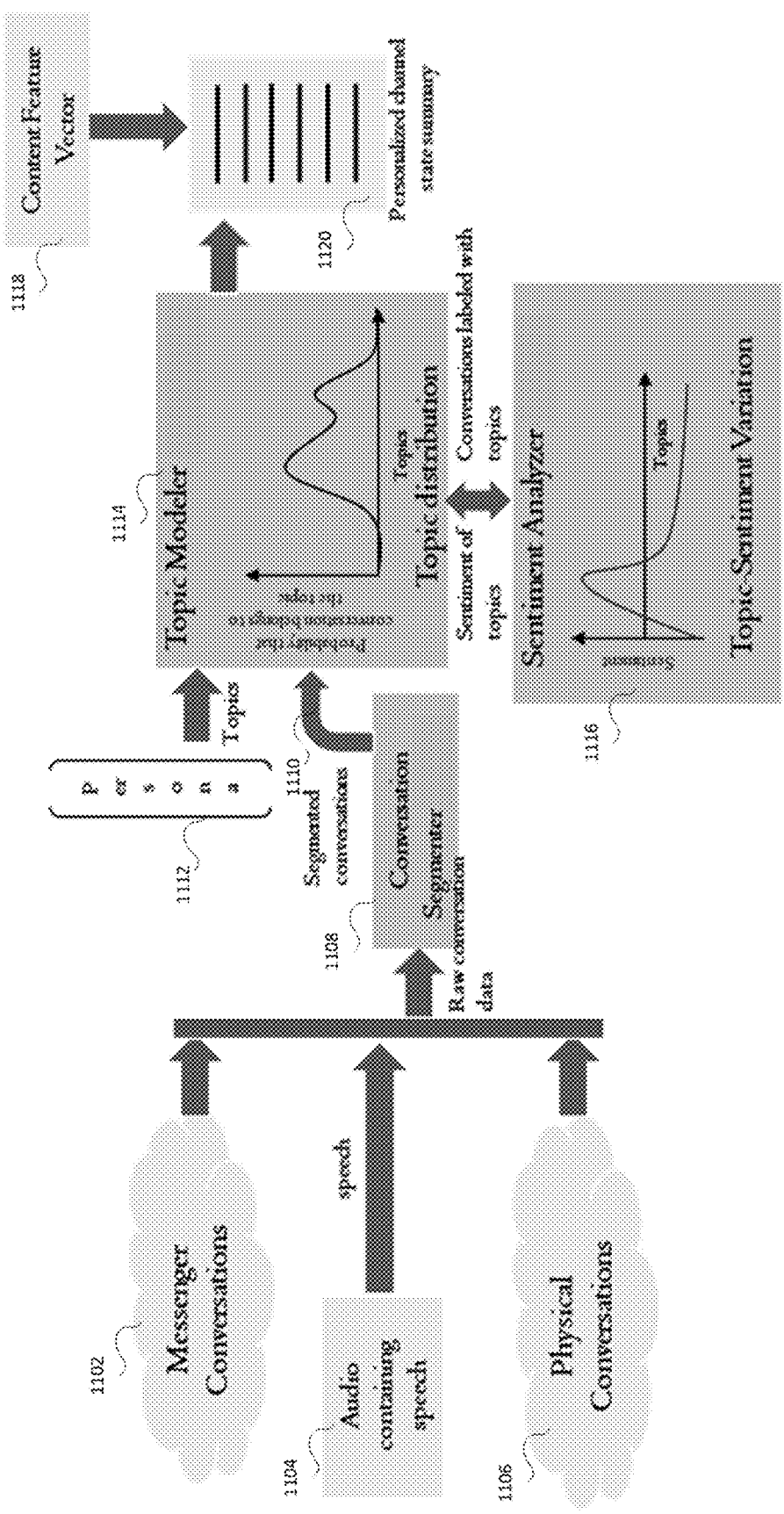
FIG. 12 illustrates an example of generating a personalized channel state summary in accordance with aspects of the present invention.

FIG. 12 illustrates an example of generating a personalized channel state summary in accordance with aspects of the present invention. In embodiments, the personalized channel state summary is generated using the techniques in FIG. 12 in addition to or instead of those techniques described above with respect to FIG. 7 (e.g., at step 740). As shown in FIG. 12, in an example embodiment, user conversation data (e.g., messenger conversations 1202, audio files in the user's library containing speech 1204, user's live or physical conversations 1206, etc.) is converted into raw data and provided to a conversation segmenter 1208. In embodiments, the conversation segmenter 1208 segments the user conversation data to form segmented conversation data 1210. The user's persona vector 1212 (e.g., generated at step 650 in FIG. 6) and segmented conversation data 1210 are used as inputs into a topic modeler 1214 that models a probability that the conversations are associated with a particular topic. In embodiments, a sentiment analyzer 1216 identifies the sentiment of each topic and the sentiment of topics is also used as an input to the topic modeler 1214. In embodiments, from the content feature vector 1218 (e.g., the feature vector 908 of FIG. 9) and the data produced by the topic modeler 1214, the personalized channel state summary 1220 is produced (e.g., as described at step 740) to identify suggested channels for the user.

Figure 13:
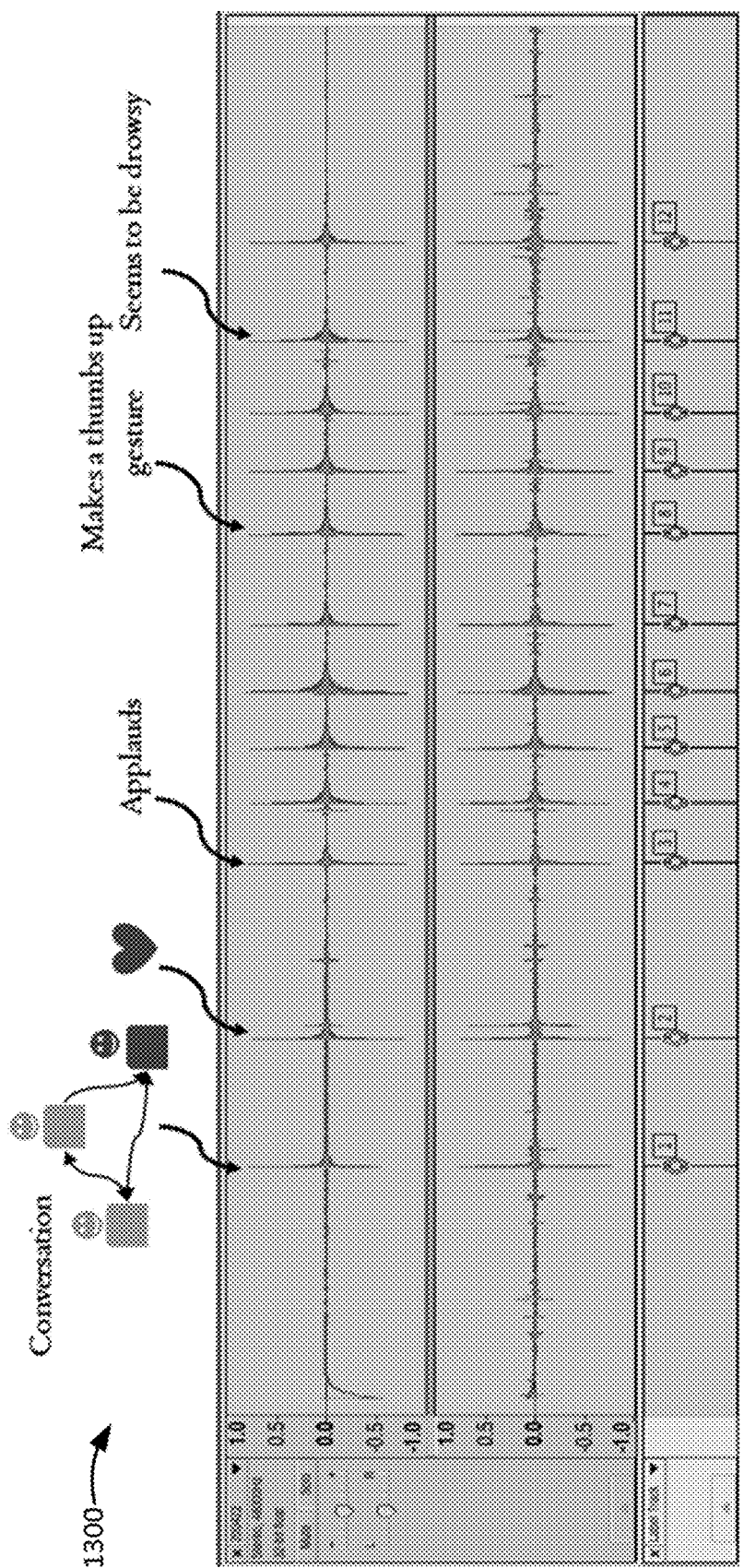
FIG. 13 illustrates an example memento in accordance with aspects of the present invention.

FIG. 13 illustrates an example memento in accordance with aspects of the present invention. As shown in FIG. 13, an in accordance with an example embodiment, the memento 1300 shows an audio print of the user's interactions during playback of content audio. For example, the memento 1300 shows time indexes and audio prints associated with the user's conversations, times when the user applauds, makes a thumbs up gesture, or appears to be drowsy (e.g., by monitoring user activity at step 810). In this way, the memento is used to identify points/time indexes of interest for content, generate a collage of the points of interest, used for recollection to be referenced at a later time, and/or used to update the user's persona profile and interests. In embodiments, the memento 1300 is displayed in a user interface. In embodiments, the memento 1300 is interactive and allows the user to select the points of interest to jump to the points of interest when replaying the content.

In embodiments, a service provider could offer to perform the processes described herein. In this case, the service provider can create, maintain, deploy, support, etc., the computer infrastructure that performs the process steps of the invention for one or more customers. These customers are, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a computing device, content for a channel for publishing;
   determining, by the computing device, a measure of trustworthiness of the content comprising:
     transcribing audio of the content to determine words of the audio;
     performing image analysis of video of the content to determine whether or not the video is relevant to the words of the audio; and
     generating a trustworthiness score based on the determining whether or not the video is relevant to the words of the audio and a comparison comparing metadata of the content and external data associated with the content;
   publishing, by the computing device, the content for the channel based on the measure of trustworthiness satisfying a threshold;
   generating, by the computing device, a channel persona profile for the channel based on the content associated with the channel and based on publishing the content;
   generating, by a computing device, a user persona profile for a user;
   determining, by the computing device, a match score indicating a level to which the channel persona profile matches the user persona profile;
   determining, by the computing device, channel discovery recommendation information based on the match score; and
   outputting, by the computing device, the channel discovery recommendation information.

2. The computer-implemented method of claim 1, wherein the measure of trustworthiness comprises a measure of accuracy of the transcribed audio with respect to one or more knowledge bases.

3. The computer-implemented method of claim 1, wherein generating the user persona profile comprises:
   determining a level of user trustworthiness based on content contributed by the user;
   determining a level of the user's appropriateness based on the content contributed by the user;
   determining the user's interests; and
   generating a persona vector identifying the user's trustworthiness, the user's appropriateness and the user's interests.

4. The computer-implemented method of claim 3, wherein generating the user persona profile further comprises converting the persona vector into a neural embedding.

5. The computer-implemented method of claim 1, wherein the generating the channel persona profile is based on attributes of the content associated with the channel and a plurality of user persona profiles for a plurality of users subscribed to the channel.

6. The computer-implemented method of claim 1, further comprising generating a memento personalized to the user, wherein the memento identifies points of interest during a session when the user access the content.

7. The computer-implemented method of claim 6, wherein the memento further comprises an audio/video collage with the conversations, gestures, and interactions associated with the user during the session.

8. The computer-implemented method of claim 1, wherein a service provider at least one of creates, maintains, deploys and supports the computing device.

9. The computer-implemented method of claim 1, wherein the receiving the content for a channel for publishing, the determining the measure of trustworthiness of the content, the publishing, the generating the channel persona profile, the generating the user persona profile, the determining the match score, the determining the channel discovery recommendation, and the outputting the channel discovery recommendation are provided by a service provider on a subscription, advertising, and/or fee basis.

10. The computer-implemented method of claim 1, wherein the computing device includes software provided as a service in a cloud environment.

11. The computer-implemented method of claim 1, further comprising deploying a system for determining the authenticity of channel content and determining the relevancy of new channels to users, comprising providing a computer infrastructure operable to perform the receiving the content for a channel for publishing, the determining the measure of trustworthiness of the content, the publishing, the generating the channel persona profile, the generating the user persona profile, the determining the match score, the determining the channel discovery recommendation, and the outputting the channel discovery recommendation.

12. A computer program product, the computer program product comprising a computer readable storage medium having program instructions embodied therewith, the program instructions executable by a computing device to cause the computing device to:
   receive content for a channel for publishing;
   determine a measure of trustworthiness of the content comprising:
     transcribing audio of the content to determine words of the audio;
     performing image analysis of video of the content to determine whether or not the video is relevant to the words of the audio; and
     generating a trustworthiness score based on the determining whether or not the video is relevant to the words of the audio and a comparison comparing metadata of the content and external data associated with the content;
   publish the content for the channel based on the measure of trustworthiness satisfying a threshold;
   determine channel discovery recommendations for a user based on matching a plurality of channel persona profiles with a user persona profile associated with the user;
   output the channel discovery recommendation information; and
   generate a memento personalized to the user, wherein the memento identifies points of interest during a session when the user access the content.

13. The computer program product of claim 12, wherein the memento further comprises an audio/video collage with the conversations, gestures, and interactions associated with the user during the session.

14. The computer program product of claim 12, wherein the user persona profile is based on a level of user trustworthiness based on content contributed by the user, a level of the user's appropriateness based on the content contributed by the user, and the user's interests.

15. A system comprising:
- a processor, a computer readable memory and a computer readable storage medium associated with a computing device;
- program instructions to receive content for a channel for publishing;
- program instructions to extract audio characteristics of the content including transcribing audio of the content to determine words of the audio, and video characteristics of content including performing image analysis of video of the content to determine whether or not the video is relevant to the words of the audio;
- program instructions to search one or more knowledge bases based on the audio characteristics and the video characteristics;
- program instructions to generate a trustworthiness score based on the determining whether or not the video is relevant to the words of the audio, and the searching the one or more knowledge bases; and
- program instructions to publish the content for the channel based on the trustworthiness score satisfying a threshold,
- wherein the program instructions are stored on the computer readable storage medium for execution by the processor via the computer readable memory.

16. The system of claim 15, wherein the trustworthiness score indicates a measure of accuracy of the transcription with respect to the one or more knowledge bases.

17. The computer-implemented method of claim 1, further comprising extracting audio and video characteristics of the content using hit point analysis, frequency patterning using spectrum analysis, and amplitude pattern using loudness analysis.

18. The computer-implemented method of claim 17, further comprising tokenizing the words of the audio to identify strong words, conversations, topics, speaker identities, mood of the content, and nature of the content.

19. The computer-implemented method of claim 18, wherein the image analysis comprises pixel-based classification and object detection.

20. The computer-implemented method of claim 19, wherein the generating the trustworthiness score is further based on the audio and video characteristics of the content extracted using the hit point analysis, the frequency patterning using spectrum analysis, and the amplitude pattern using loudness analysis.

* * * * *